United States Patent

Draskovich

[11] Patent Number: 6,000,906
[45] Date of Patent: Dec. 14, 1999

[54] CERAMIC AIRFOIL

[75] Inventor: Barry S. Draskovich, Scottsdale, Ariz.

[73] Assignee: AlliedSignal Inc., Morristown, N.J.

[21] Appl. No.: 08/928,365

[22] Filed: Sep. 12, 1997

[51] Int. Cl.[6] .................................................. F04D 29/60
[52] U.S. Cl. ........................ 415/209.4; 415/200; 415/189
[58] Field of Search ............................ 415/209.2, 209.3, 415/209.4, 200, 189, 190

[56] References Cited

U.S. PATENT DOCUMENTS

| | | |
|---|---|---|
| 730,363 | 6/1903 | Geisenhoner . |
| 792,659 | 6/1905 | Jungren . |
| 823,909 | 6/1906 | Wilkinson . |
| 2,599,654 | 6/1952 | Musikant . |
| 2,807,433 | 9/1957 | Halford et al. . |
| 2,834,537 | 5/1958 | Neary . |
| 2,853,271 | 9/1958 | Findley . |
| 2,925,998 | 2/1960 | Hayes et al. . |
| 3,199,294 | 8/1965 | Hagen . |
| 3,619,077 | 11/1971 | Wile et al. . |
| 3,708,242 | 1/1973 | Bruneau et al. . |
| 3,836,282 | 9/1974 | Mandelbaum et al. . |
| 3,849,023 | 11/1974 | Klompas . |
| 3,867,065 | 2/1975 | Schaller et al. . |
| 3,873,234 | 3/1975 | Penny . |
| 3,932,056 | 1/1976 | Tai ........................................ 415/209.4 |
| 3,966,353 | 6/1976 | Booher, Jr. et al. . |
| 4,009,969 | 3/1977 | Kadera et al. . |
| 4,067,955 | 1/1978 | Noakes et al. . |
| 4,076,451 | 2/1978 | Jankot ................................... 415/209.4 |
| 4,245,954 | 1/1981 | Glenn .................................... 415/209.3 |
| 4,260,326 | 4/1981 | Scott et al. . |
| 4,260,327 | 4/1981 | Armor et al. . |
| 4,314,791 | 2/1982 | Weiler . |
| 4,321,010 | 3/1982 | Wilkinson et al. . |
| 4,396,349 | 8/1983 | Hueber . |
| 4,398,866 | 8/1983 | Hartel et al. . |
| 4,421,153 | 12/1983 | Wilkinson et al. . |
| 4,480,956 | 11/1984 | Kruger et al. . |
| 4,646,810 | 3/1987 | Lardellier . |
| 4,722,309 | 2/1988 | Guidoboni et al. . |

(List continued on next page.)

FOREIGN PATENT DOCUMENTS 57.426   1/1953   France .

OTHER PUBLICATIONS

Patent Abstracts of Japan, vol. 010, No. 234 (M–507), Aug. 14, 1986 & JP 61 066802 A, Apr. 5, 1986.

T. Sakamoto, H. Horinouchi, and T. Maeda/Kyocera Corporation, Kagoshima, Japan/Ceramics–to–Metal Joining Technology for Gas Turbine Rotors/Gas Turbine & Aeroengine Congress Expo. Jun. 4–8, 1989.

Masaya Ito, Noboru Ishida, and Norio Kato/NGK S–park Plug Co., Ltd./Development of Brazing Technology for Ceramic Turbocharger RotorsS.

Primary Examiner—Edward K. Look
Assistant Examiner—Richard Woo
Attorney, Agent, or Firm—Robert Desmond, Esq.

[57] ABSTRACT

A stator assembly of a gas turbine engine includes first and second annular metal stator rims. The stator rims, positioned in parallel, include a plurality of ceramic blades therebetween, each ceramic blade having a rounded nose and a flattened and tapered tail. Each ceramic blade further includes an opening for receiving a mounting pin. The mounting pin mounts between the first and second annular stator rims, clamping and containing the ceramic airfoil therebetween in a position relative to an axis of the turbine engine.

8 Claims, 4 Drawing Sheets

U.S. PATENT DOCUMENTS

| | | |
|---|---|---|
| 4,768,924 | 9/1988 | Carrier et al. . |
| 4,786,347 | 11/1988 | Angus . |
| 4,826,645 | 5/1989 | Angus . |
| 4,874,031 | 10/1989 | Janney . |
| 4,901,520 | 2/1990 | Kozak et al. . |
| 4,907,946 | 3/1990 | Ciokajlo et al. . |
| 4,970,125 | 11/1990 | Janney . |
| 5,002,460 | 3/1991 | Lee et al. . |
| 5,074,749 | 12/1991 | Fouillot et al. . |
| 5,074,752 | 12/1991 | Murphy et al. . |
| 5,090,866 | 2/1992 | Blair . |
| 5,105,625 | 4/1992 | Bell, III et al. . |
| 5,129,783 | 7/1992 | Hayton . |
| 5,188,507 | 2/1993 | Sweeney . |
| 5,380,154 | 1/1995 | Norton et al. . |
| 5,411,368 | 5/1995 | Chase et al. . |
| 5,493,855 | 2/1996 | Walters et al. .......................... 415/115 |
| 5,511,940 | 4/1996 | Boyd . |
| 5,538,380 | 7/1996 | Norton et al. . |

CERAMIC AIRFOIL

BACKGROUND OF THE INVENTION

This invention relates generally to gas turbine engines and more particularly to improved airfoil construction. An improved blade construction embodying a member of a first material such as ceramic and shaped as an airfoil cooperatively arranged with a second material such as metal for the insertion in the air flow path of a reduction gas turbine engine. The improved blade can absorb and function with thermally induced stress. Further the enhanced airfoil exhibits durability characteristics suitable for use in a high-temperature environment.

In a well-known gas turbine engine, air is compressed in a rotating compressor, heated in a combustion chamber and expanded through a turbine. To increase the available energy in the turbojet cycle, and hence the thrust and efficiency of the engine, designers have conventionally attempted to increase the turbine inlet temperature because turbine engine power is directly related to turbine inlet temperature, as is turbine engine efficiency.

However, as a result of the high temperatures necessary to operate the gas turbine engines, trailing and leading edges of the turbine's stator blade are often burned away. Repairs to restore the turbine stator blade to functional condition are expensive and require extensive hours of welding. The erosion and burning of the high pressure turbine stator blade is a primary repair frequency item for turbomachinery applications. To improve the life of turbine stator blades, industry has turned to methods such as cooling blades while in use.

One method, therefore, of providing more efficient turbojet operation, i.e. higher cycle temperatures and hence higher thrust values for a given size engine, involves the use of more sophisticated and advanced turbine airfoil cooling techniques to permit higher turbine inlet temperatures. With these techniques, turbine nozzle (vane) and rotor blade temperatures may be brought within the capability of existent heat or oxidation resistant materials (metal). However, there is a limit to temperature that can be achieved with these materials.

As an alternative to such cooling methods or techniques recourse is made to improve blade or vane materials and construction methods. It is known, for example, that ceramic materials have the ability to withstand significantly higher temperatures than the known refractory alloys when used in the conventional blade or vane designs, even when the latter are intensely cooled. In particular, the use of ceramic material would appear to be indicated at the leading edge of the turbine airfoil where the temperatures are always highest and where cooling is most difficult since the heat input is highest here also. It will be understood that the term "ceramic" as herein used includes composites of nonmetallics and metallics, the latter sometimes being referred to as ceramics. Examples of the latter materials which have been evaluated and been found to perform well in the practice of the present invention include: (1) chromium and 30 weight percent $M_gO$, or $Cr30M_gO$, and (2)$Al_2O_3$ or (3) $SI_3N_4$.

However, ceramic materials present certain problems that have heretofore prohibited their widespread use for constructing part or all of the blade or vane. Firstly, ceramic materials do not have the tensile strength of metallic materials. Secondly, due to its usually relatively low ductility, ceramic material has a tendency to crack under the impact of severe or suddenly applied thermal shock or stresses such as may occur in advanced lightweight aircraft gas turbines. Thirdly, where it is desired to strengthen the blade or vane structurally, such as by means of metallic body or strut member or members, the dissimilar characteristics of the metal body and the ceramic materials in the areas of ductility, thermal conductivity and brittleness, for example, create additional problems concerning how to mate these materials in an integral airfoil construction.

SUMMARY OF THE INVENTION

A turbine stator assembly includes first and second annular metal stator rims (shrouds or platforms). The first and second metal stator rims contain a plurality of ceramic blades therebetween. Each ceramic blade comprises an airfoil having a blunt rounded nose and a flattened and tapered tail. An opening is disposed within each airfoil for receiving a mounting pin conforming to the opening. The mounting pin mounts between the first and second annular stator rims, clamping and containing the ceramic blades between the stator rims in a predetermined positional relation to the axis of said engine. The ceramic blade juxtaposes against the first and second annular stator rims forming a metal-to-ceramic joint at each interface. A braze or compliant layer can be disposed between the first and second stator rims and the ceramic blade protects and insulates the metal-to-ceramic interface.

BRIEF DESCRIPTION OF THE DRAWINGS

The foregoing and other advantages and benefits to be derived from use of the present invention will become more apparent as the following detailed description read in conjunction with the appended claims hereto and the following drawings in which:

While we have disclosed the invention as utilized in the construction of a lightweight aircraft gas turbine engine it will be appreciated that the invention may be equally used to advantage in other bladed components of this and other types of turbomachinery wherein a high-temperature environment is present having for instance centrifugal or axial compressors.

DESCRIPTION OF THE PREFERRED EMBODIMENT

Figure 1:
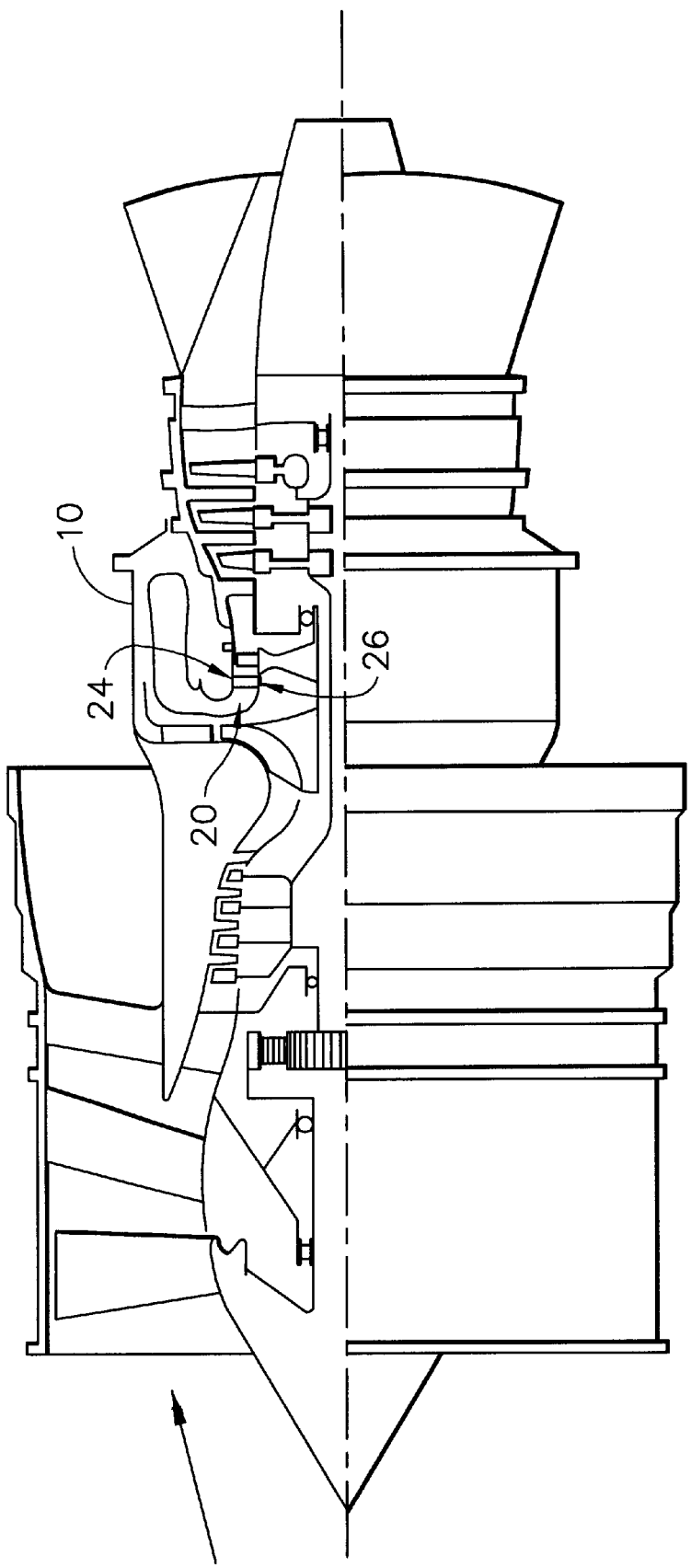
FIG. 1 is an illustration of a side view of an axial flow gas turbine engine incorporating the invention.
Figure 2:
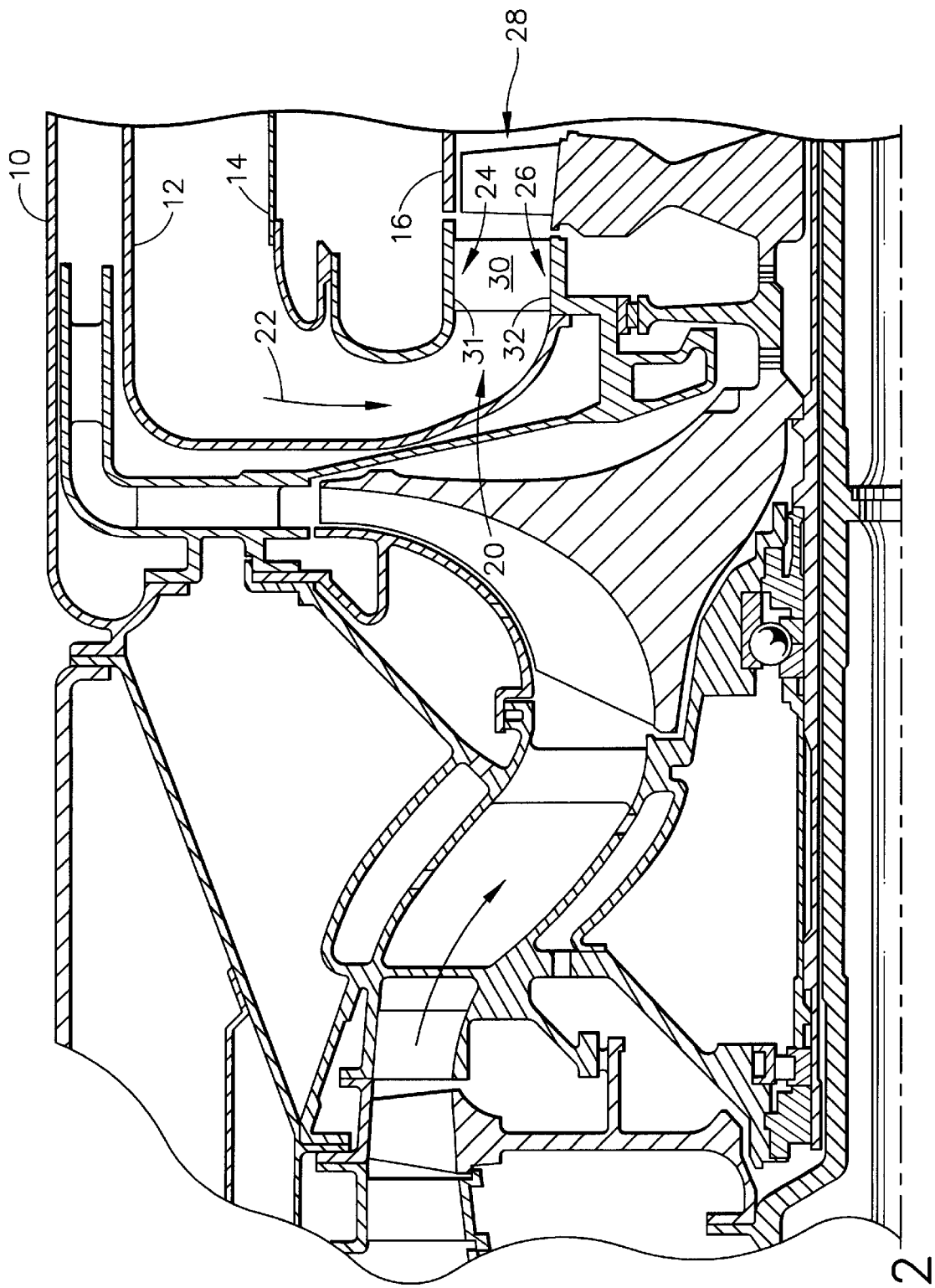
FIG. 2 is a more detailed illustration of a portion of the engine shown in FIG. 1.

Briefly, in a disclosed gas turbine engine preferred embodiment of the invention, a turbine nozzle blade constructed to include a hollow main body portion of ceramic material is provided. Turning now specifically to FIGS. 1 and 2, shown is a portion of the turbine section of a typical engine. Thus, an outer casing member 10, an outer liner member 12, an inner liner member 14 and an inner casing member 16 are provided. The outer and inner liner members 12 and 14 form an annular combustor having a discharge passage or turbine nozzle inlet area, indicated generally at 20. The large arrow 22 depicts the direction of the main flow of hot combustion gas as it enters the turbine nozzle or diaphragm. The turbine nozzle comprises an outer annular band 24, an inner annular band 26 and a plurality of radially extending nozzle stator blades 30. After the hot gas flow is turned in the proper direction by the nozzle blades it impinges upon and rotates a bladed turbine rotor wheel, indicated generally at 28, wherein the energy is extracted from the gas flow, as hereinabove explained.

Figure 3:
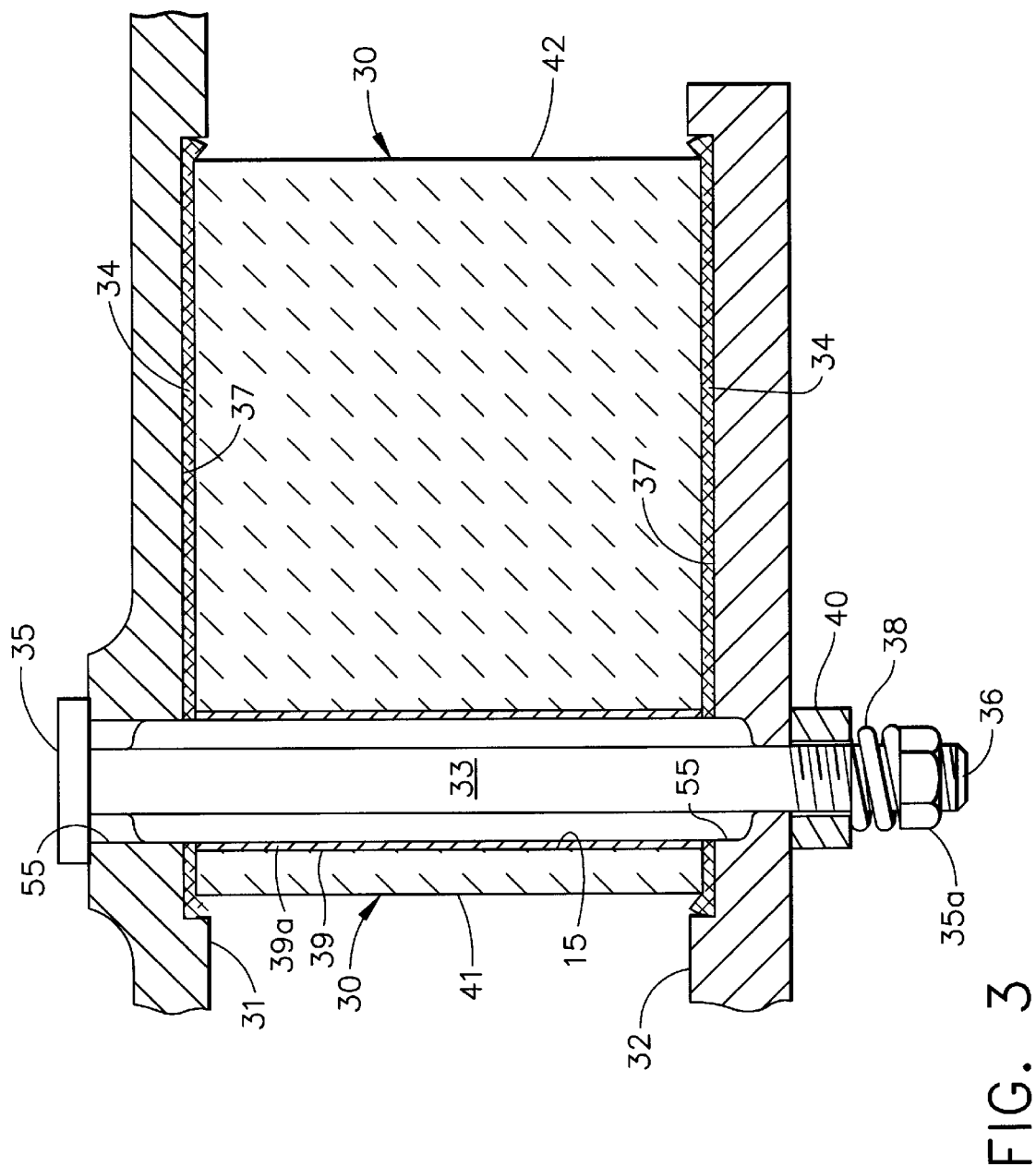
FIG. 3 is an illustration of a stator assembly according to the invention.
Figure 4:
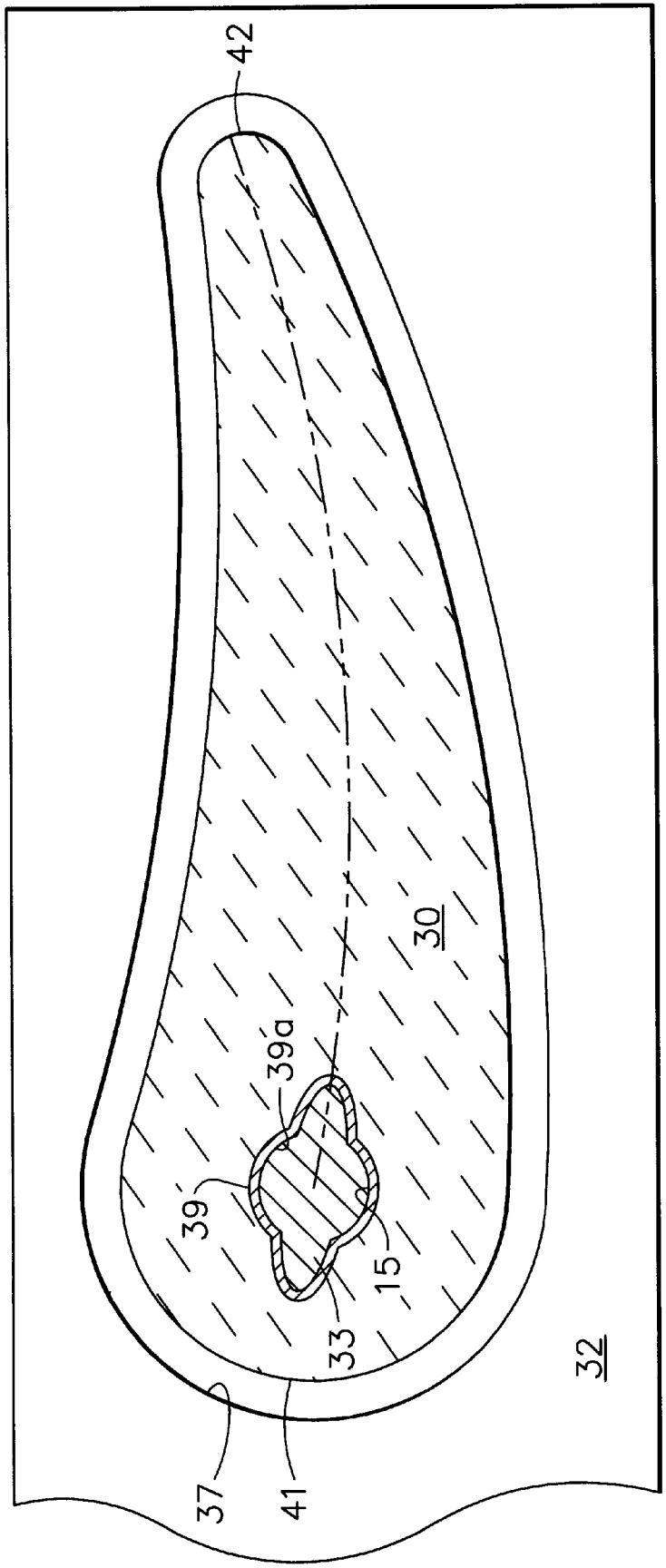
FIG. 4 is a perspective illustration of the stator blade of FIG. 1 with portions broken away to reveal details of construction.

Ideally, a gas turbine engine is comprised of an annular ring or row of stator blades 30 for vectoring hot combustion air to the turbine. Each individual blade assembly can be of a substantially identical construction to maintain uniform air flow. Referring additionally to FIGS. 3 and 4, a first metal stator rim 31 is disposed in parallel to a second metal stator rim 32. The two metal stator rims 31 and 32 house the ceramic blade 30 therebetween. The ceramic blade 30 is configured as an airfoil having a blunt rounded nose and a flattened and tapered tail. Each ceramic blade 30 also has a through opening 15 extending between the stator rims 31 and 32 for receiving or retaining a mounting pin 33 therethrough. The opening 15 can be shielded or jacketed with a metal sleeve 39 having an inner surface 39a and the mounting pin 33 can be inserted within the metal sleeve 39 located within the ceramic blade 30.

The ceramic material used for each blade 30 is selected to resist heat and erosion common to metal blades. Further the blade can be designed to resist operational difficulties such as resist heat and erosion common to metal blades. Each blade 30 can include a thicker elliptical portion 41 which tapers into a thinner curved portion 42. The elliptical portion of the stator blade can include the opening 15 for receiving the mounting pin 33. The leading edge of the ceramic stator blade 30 withstands erosion regardless of whether the stator blade is cooled by cooling methods already disclosed in prior art.

The first and second metal stator rims 31 and 32 can contain one or more stator blades 30 therebetween in a nearly fixed position. Each metal stator rim 31 and 32 includes troughs or recesses 37 configured for conformably receiving the ceramic blades 30 within the stator rims 31 and 32. The metal stator rims 31 and 32 contain each stator blade 30 therebetween in a predetermined fixed relation relative to the engine axis A (see FIG. 1). The predetermined fixed relation of a blade 30 relative to the engine axis A is determined by the configuration of its corresponding trough 37. Each trough traverses the width of the metal stator rim 31 and 32 and has a perimeter shaped to receive a stator blade 30. Preferably the trough recesses can be at least 0.030 inches but no more than 0.100 inches in depth, for receiving stator blade 30, to form a metal-to-ceramic interface.

Each recess 37 of the stator rims 31 and 32 further includes a hole or detent 55 having an elliptical shape. The elliptical holes 55 in the rims 31 and 32 compare in contour with the openings 15 in the ceramic blade 30 for receiving the mounting pin 33 and position the blade 30 relative to contour and position of the recess 37. The mounting pin 33 mounts through the hole 55 in the first annular stator rim 31, through the opening 15 of the blade 30 and through the hole 55 of the second stator rim 32.

Each blade opening 15 is asymmetric in cross section and preferably elliptical. The elliptical-shaped pin 33 fits and more suitably engages the ceramic blade 30 than a traditional round pin. While in operation, the stress on the airfoil created by rapid gas flow through the turbine distributes over the interface of the elliptical pins 33 to the receiving elliptical opening 15 in the blade 30.

The mounting pin 33 is surrounded by a metal sleeve 39. The mounting pin 33 has a fixed cap 35 at one end and a clamping cap 35a at the other end. The clamping cap 35a secures a spring 38 around the pin 33 and against the metal stator rim 32. The spring 38 provides a constant clamping force for retaining the ceramic airfoil 30 in a fixed relation. The mounting pin 33 is tension loaded to grow and shrink with engine temperature so that the clamping force between the rims 31 and 32 will retain the blade 30 in the predetermined position relative to the engine axis A. The mounting pin 33 grows and shrinks relative to the engine temperature so that the clamping force remains constant between the pin and the rim. The constant pressure applied to the rims retains the blade 30 between the first and second metal stator rims 31 and 32 in a fixed relation relative to the engine axis A. In an alternate embodiment the pin 33 comprises a spring loaded bolt of the insert and twist type.

A felt metal compliant layer 34 disposed between the blade 30 and the stator rims 31 and 32 protects and insulates the blade 30 from wear as a result of intense heat conditions causing expanding and shrinking of the rims 31 and 32 in relation to the blade. In the preferred embodiment, a Metal Fiber Pad (MFP) 34 insulates each ceramic blade 30 from contact loading against the metal rims 31 and 32. Each MFP 34 consists of sintered metallic fibers subsequently melted and refined to form an air seal between the metal stator rims 31 and 32 and the ceramic blade 30. The troughs 37 in the metal stator rims 31 and 32 receive the MFP 34 and brazing or casting attaches the MFP 34 to the metal stator rims 31 and 32. The mounting pin 33 secures the high temperature stator assembly, containing the blades 30 within the trough 37 of the metal stator rims 31 and 32 in a fixed fashion. In the alternative, brazing methods well-known in the art may provide an adequate airseal at the ceramic-to-metal interface when MFP methods are unavailable.

It will be apparent to those skilled in the art that the ceramic blade is constructed with various curvature for most efficient momentum exchange with the hot gas flow of the turbomachinery. While the preferred embodiment of the present invention has been specifically illustrated and discussed, the foregoing detailed description should be considered exemplary in nature and not as limiting to the scope and spirit of the invention as set forth in the appended claims.

What is claimed is:

1. In a gas turbine engine, a turbine stator assembly comprising:
   a mounting pin;
   first and second annular metal stator rims, each said rim having a first opening for receiving the mounting pin;
   a ceramic blade configured as an airfoil having a blunt rounded nose and a flattened and tapered tail, said blade having a second opening for comfortably receiving the mounting pin; and
   the metallic mounting pin clamping and containing the blade between the stator rims in a predetermined positional relation to an axis of said engine, the ceramic blade being non-rotational,
   wherein the pin has an end that is tension spring loaded to grow and shrink with engine temperature so that the clamping between the rims retains the blade in the predetermined relation.

2. The stator assembly of claim 1, wherein the first and second rims include blade troughs for receiving the blade in the stator rims and for positioning the airfoil of the blade relative to the axis of the engine.

3. The stator assembly of claim 1, wherein the pin and the first and second openings have an asymmetric perimeter.

4. The stator assembly of claim 1, wherein the pin and the first and second openings have elliptical perimeter.

5. The stator assembly of claim 1, further comprising a compliant layer disposed between rims and blade, the layer including fine metallic fibers sintered to form an air seal.

6. The stator assembly of claim 1, wherein a heat braze seals the ceramic blade to the first and second metal stator rims.

7. The stator assembly of claim 1, wherein the pin is made of metal.

8. In a turbine engine, a turbine for converting hot expanding combustion gas into mechanical power, the turbine comprising a turbine wheel;

and a stator assembly for directing the combustion gas towards the turbine wheel, the stator assembly including a plurality of ceramic blades;

inner and outer stator rims, the rims having a plurality of blade troughs for positioning the blades; and a plurality of metallic mounting pins corresponding to the ceramic blades, each mounting pin extending through a corresponding ceramic blade and through openings in the inner and outer rims, each mounting pin having at least one end that is tension spring loaded to place the corresponding blade under continuous compression, the ceramic blades being non-rotational.

* * * * *